Nov. 17, 1925.  1,562,131
R. H. TOLL
SELF STARTING CREAM REMOVER
Filed July 30, 1924
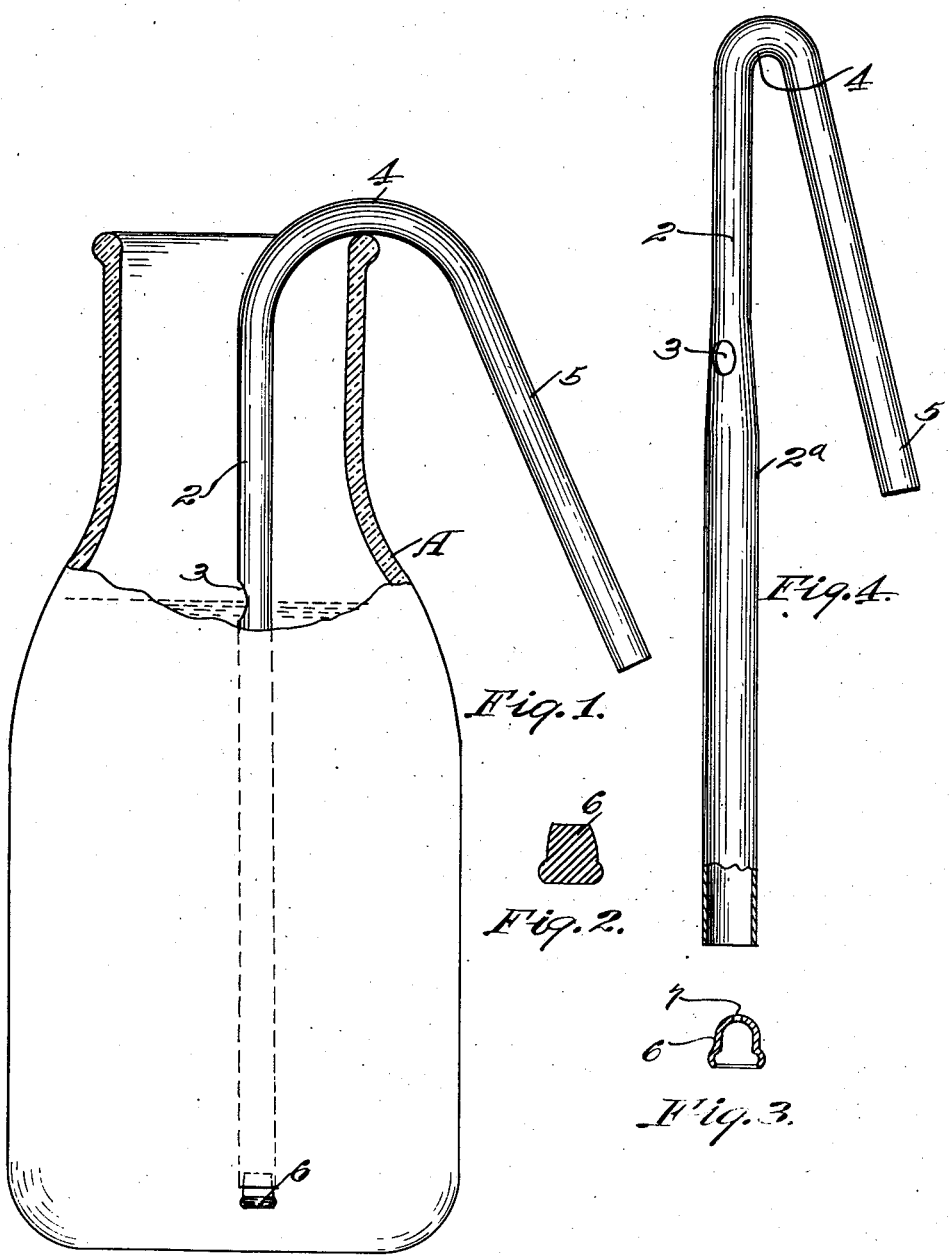
Inventor;
Rensselaer H. Toll,
By
Frederick E. Maynard
his Atty Patented Nov. 17, 1925.

1,562,131

UNITED STATES PATENT OFFICE.

RENSSELAER H. TOLL, OF LONG BEACH, CALIFORNIA.

SELF-STARTING CREAM REMOVER.

Application filed July 30, 1924. Serial No. 729,126.

*To all whom it may concern:*

Be it known that I, RENSSELAER H. TOLL, a citizen of the United States, residing at Long Beach, county of Los Angeles, California, have invented a new and useful Improvement in a Self-Starting Cream Remover, of which the following is a specification.

This invention relates to siphoning apparatus and has for an object to provide a device of utmost simplicity, and which is self-starting in action.

An object is to provide a siphonic device consisting of a simple tube of practically uniform diameter, and having, in its preferred form but a single liquid inlet.

An object is to provide a siphoning device which can readily be cleaned and kept sweet and sanitary, which is an important feature when the device is to be used for removing cream from above milk in the common milk bottles.

Other objects and advantages will be made manifest in the following specification of apparatus of this invention, embodiments of which are shown in the accompanying drawing; it being understood that other modifications, variations and adaptations may be restorted to within the spirit of the invention and its scope as here claimed.

The invention consists of means for accomplishing the desired objects.

Fig. 1 is an elevational view showing the device as applied to remove cream from a milk bottle.

Fig. 2 is an axial section of a solid stopper for the tube trunk.

Fig. 3 shows a hollow plug.

Fig. 4 is an elevation and partial section of a slightly modified trunk portion of the tube.

I am aware that it has been proposed to construct a self starting siphon device by employing an air bell to discharge air through a small hole into a tube having a liquid intake mouth adjacent the air hole so that as air rises in the submerged tube flow will be initiated at the mouth and continue through the tube. An object of my present invention is to eliminate both the bell and the restricted air port and to provide a more reliably acting device.

The present invention employs a wholly different principle of operation from that of discharging air through a restricted orifice into the tube.

The device here shown comprises a simple tube having a trunk portion 2 to be submerged sufficiently to cover a good-sized inlet mouth 3, above which is a goose-neck 4 having a discharge spout 5.

The bottom end of the tube trunk 2 could, for all intents and purposes, be permanently closed, but as it is very desirable to enable the trunk to be kept thoroughly clean I provide an open bottom end which may be closed by any plug 6 when the trunk is to be submerged.

The device in its entirety therefore consists of a goose-neck tube with an inflow orifice 3 in the trunk, this being closed at the bottom. The trunk, it will be seen, forms an air pocket below the liquid mouth 3, which is in full, open, unrestricted and straight communication with the bow of the neck. By repeated use of this device I have found that when the air trunk is submerged in upright position, (Fig. 1) the liquid, rushing down into the trunk, displaces the air which, of its own property, tends to rise and expand in reaction to the pressure of the incoming liquid. As the air rushes up past the inflow mouth 3 and into the neck 4, a positive upflow of liquid is established in the neck and spout, and this flow continues until the level of the liquid in the container (here shown as a milk bottle) A, falls to the mouth 3.

While the apparatus may be employed for various purposes a great field of use is to remove cream from milk in bottles. In this use it is important to keep the device perfectly clean and I therefore employ the removable plug 6. When this is removed a string or flexible brush can be run in and through the tube to clean it out.

I have found that liquid can be admitted through an aperture 7 in a plug 6, Fig. 3, to facilitate the action of escaping air in and from the trunk.

When desired, the trunk may be of larger diameter than the tube neck, as is shown at 2ª, Fig. 4. This affords a large volume of air in the trunk pocket to effect a discharge of liquid and inducing a flow.

What is claimed is:

1. A self-starting siphon device comprising communicating goose-neck and trunk portions; the latter forming an elongated, closed bottom air chamber submersible in liquid, the passage from the chamber to the goose-neck being free and unobstructed for the upflow of air, and the trunk being laterally apertured, in its upper portion, for the free inflow of liquid into the unobstructed passage.

2. A siphon device having a one-piece tube having a goose-neck and a closed bottom trunk part having a straight, direct, unobstructed and unrestricted line of communication with the goose-neck; said trunk having an opening at its upper part for the inflow of liquid when the trunk end is submerged.

3. A siphoning device comprising a tube of generally uniform diameter having a goose-neck with a trunk part, closed at its submersible bottom end; said tube having a liquid, inflow mouth in the upper portion of the trunk.

4. A siphoning device comprising a tube having a trunk part, a removable closure for the bottom end of said part, and a goose-neck for the upper end of the trunk; the said upper end having a liquid inflow below the goose-neck.

5. A siphoning device comprising a tube having a trunk part, a removable closure for the bottom end of said part, and a goose-neck for the upper end of the trunk; the said upper end having a liquid inflow below the goose-neck; said closure having a small passageway into the trunk.

RENSSELAER H. TOLL.